June 22, 1965  F. FAULHABER  3,191,081
PERMANENT MAGNET MINIATURE MOTOR
Filed April 13, 1961  4 Sheets-Sheet 1

June 22, 1965  F. FAULHABER  3,191,081
PERMANENT MAGNET MINIATURE MOTOR
Filed April 13, 1961
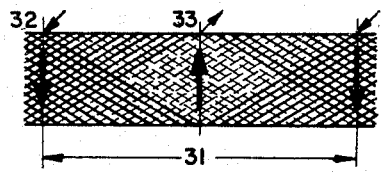
Fig.7
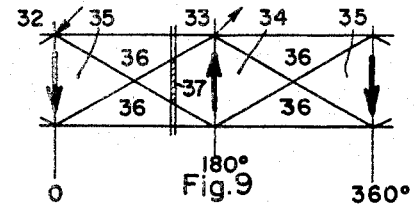
Fig.8
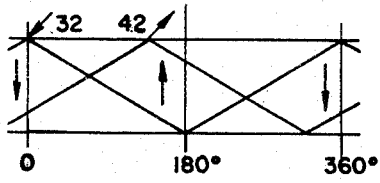
Fig.12
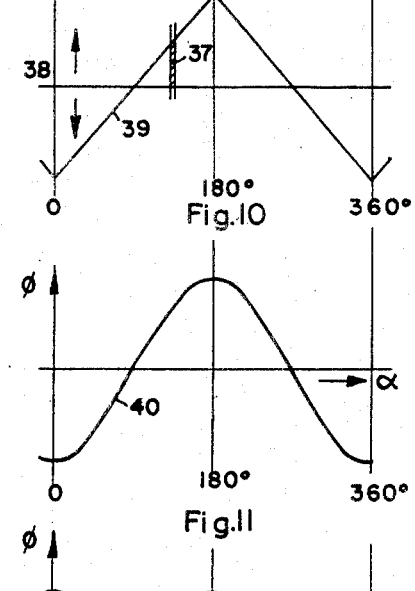
Fig.9
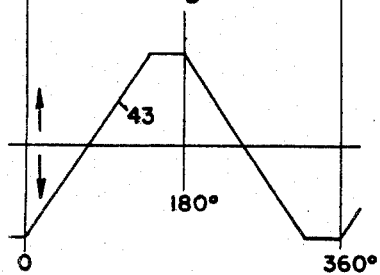
Fig.13
Fig.10
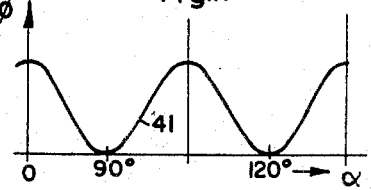
Fig.11
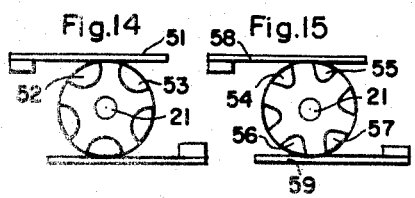
Fig.14   Fig.15

June 22, 1965  F. FAULHABER  3,191,081
PERMANENT MAGNET MINIATURE MOTOR
Filed April 13, 1961  4 Sheets-Sheet 4 ically measuring motors into transportable devices without requiring excessive cost or excessive amounts of space. For that reason, various problems in the measuring and control technique have not found a satisfactory solution.

United States Patent Office 3,191,081
Patented June 22, 1965

3,191,081
PERMANENT MAGNET MINIATURE MOTOR
Fritz Faulhaber, Johann-Sebastian-Bach-Weg 9,
Schonaich, Wurttemberg, Germany
Filed Apr. 13, 1961, Ser. No. 105,851
Claims priority, application Germany, Apr. 14, 1960,
F 25,603
7 Claims. (Cl. 310—154)

My invention relates to a winding for a miniature electric motor or similar electromagnetic systems and is disclosed herein as a continuation-in-part of my copending application Serial No. 808,784, filed April 24, 1959, and now abandoned.

Figure 3:
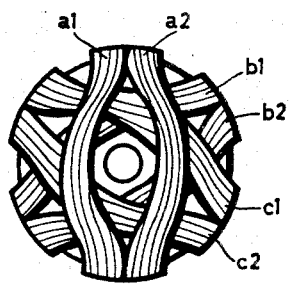
Figure 4:
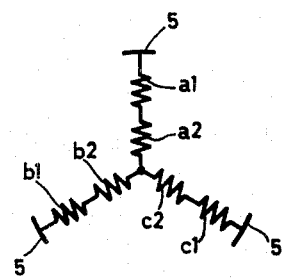
Figure 5:
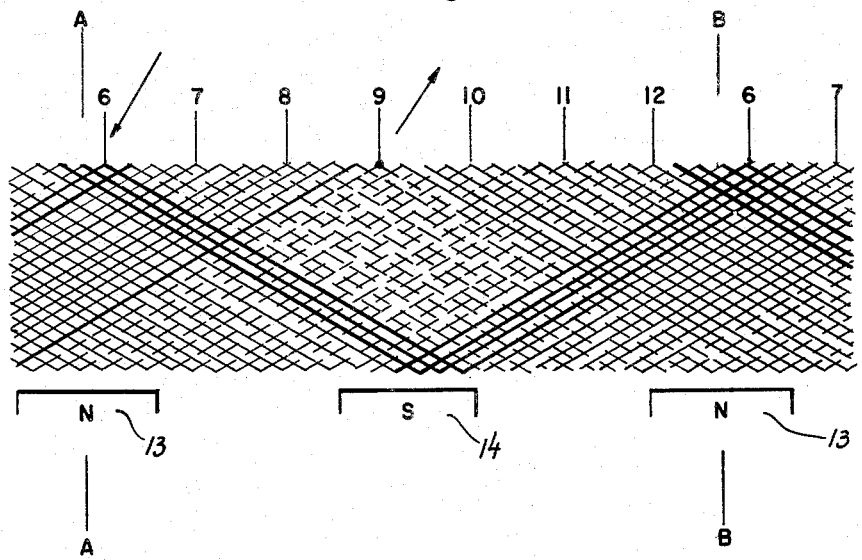
Figure 6:
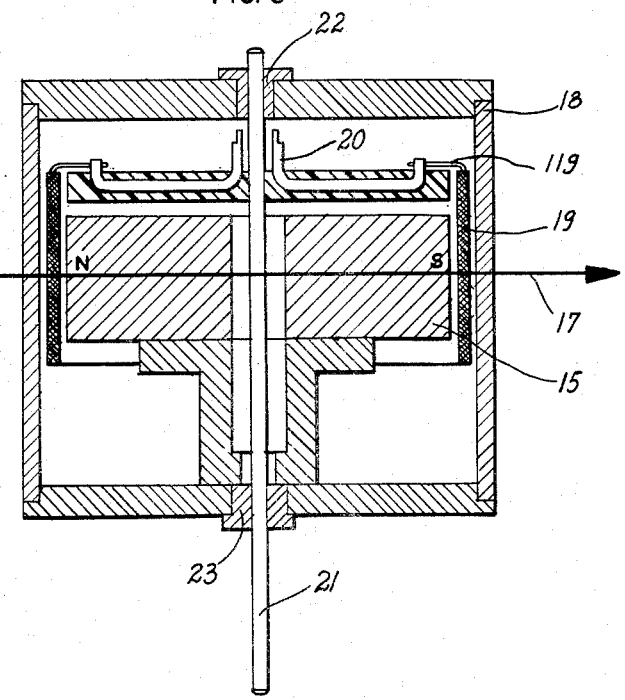
Figure 16:
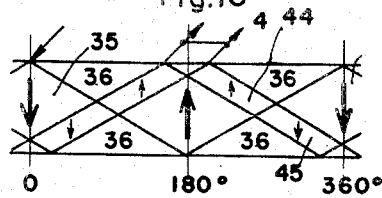
Figure 18:
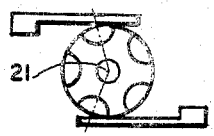
Figure 17:
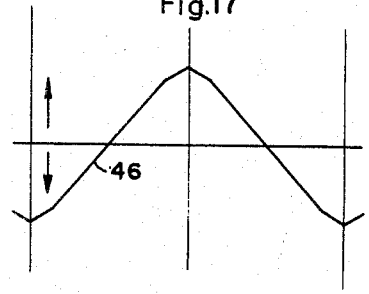
Figure 21:
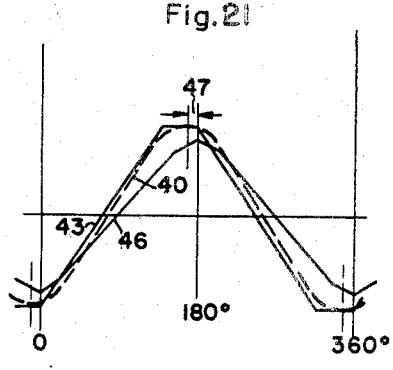
Figure 19:
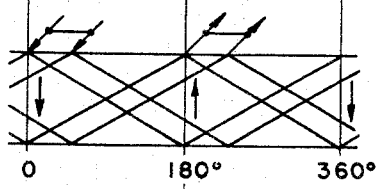
Figure 20:
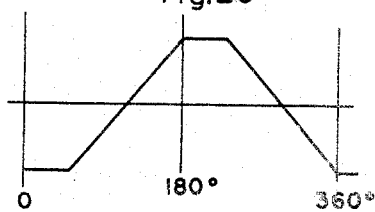

The invention is described hereinafter with reference to the drawings, in which FIGS. 1 to 4 are explanatory and representative of prior art; FIG. 5 shows a planar development of a cylindrical rotor winding according to the invention; FIG. 6 is an axial section of the same winding and the associated parts of a miniature-size electric motor; FIGS. 7 to 13 are explanatory diagrams relating to the same motor; FIGS. 14 and 15 show two commutators applicable in the motor; FIGS. 16 and 17 are further explanatory diagrams; FIG. 18 shows the commutator of FIG. 14 in a different rotary position; and FIGS. 19 to 21 are further explanatory diagrams.

The miniature-size electric motors now commercially available are too large for many purposes and have an extremely poor efficiency. The conventional design with a permanent stator magnet and a wound iron rotor is expensive to manufacture and its efficiency leaves much to be desired. The miniature motors now available on the market are, on the one hand, intended predominantly only for use in toys where a relatively cheap product is desired or, on the other hand, the motors are of high quality for accurate operation such as required for time pieces and other measuring purposes, but the latter motors are relatively large and considerably more expensive than toy motors. In many cases, it is also difficult to satisfactorily mount toy motors as well as high-quality measuring motors into transportable devices without requiring excessive cost or excessive amounts of space. For that reason, various problems in the measuring and control technique have not found a satisfactory solution.

It is an object of my invention, therefore, to provide an electric motor or similar dynamoelectric device whose properties closely approach those of the measuring motors but which, with respect to manufacturing cost, is to a great extent comparable with the cheaper toy motors.

To this end, and in accordance with my invention, I use, in lieu of the conventional moving-iron rotor, the system of a moving coil generally known from moving-coil instruments, and give the moving coil a particular design by virtue of which it attains the properties that approximately satisfy the requirements of a measuring motor.

Figure 1:
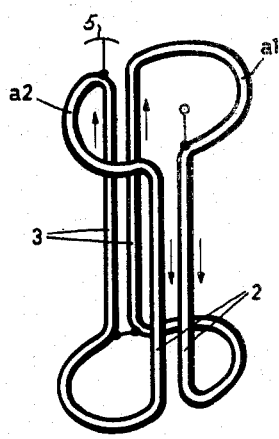

Before dealing with the invention more in detail, it will be helpful to first refer to the system of a moving coil motor, particularly to the winding of such a motor, as perspectively represented in FIG. 1. The coil shown in FIG. 1 is composed of two half-portions 1' and 1" which, placed in the illustrated position relative to each other, represent two pairs of conductors which are denoted by 2 and 3 respectively. These conductor pairs are traversed by currents in the direction indicated by arrows. These currents produce, within a radial magnetic field, a torque which places the winding assembly in rotation about its axis.

Figure 2:
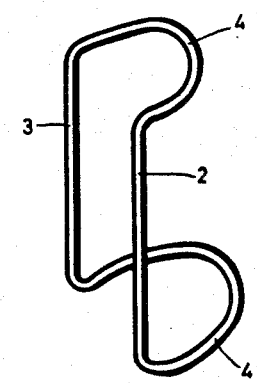

The two half-portions of the winding, of which one is separately illustrated in FIG. 2, comprise the active conductor portions 2 and 3, and an inactive arcuate portion 4.

In an electric motor with a three-part commutator, three such pairs of windings are used, as is apparent from the axial view of a rotor shown in FIG. 3.

FIG. 3 relates to a motor with three-layer commutator and shows three pairs of windings, for example, $a1$ and $a2$, $b1$ and $b2$, $c1$ and $c2$. FIG. 3 is a view in the axial direction. The conventional connection of the three winding pairs is apparent from FIG. 4. In FIG. 4, $a1$, $a2$ and $b1$, $b2$ and $c1$, $c2$ denote the above-mentioned winding pairs, whereas 5 denotes the three appertaining commutator segments. This known type of winding has the disadvantage that it is not possible to reduce at will the overall length of the motor. If such reduction in length it attempted, the ratio of the active copper, constituted by the distances 2 and 3 in FIG. 2 which are parallel to the axis, to the inactive copper, constituted by the portions 4 at the front sides, become so poor that the efficiency is greatly impaired. Another disadvantage is the fact that these windings constitute shaped coils, namely, coils which are previously wound in a jig in a given shape, which must then be hardened and which are thereafter individually composed to form a three-phase armature. Consequently, the manufacturing process is difficult. The connecting arcs 40 (FIG. 3) and 4 (FIG. 2) of the active copper, the so-called end turns or winding ends, also require much space, and thus increase the axial length of the motor to an undesired degree. Furthermore, it is hardly possible, due to the concentrated arrangement of the winding in individual winding strands, to attain working air gaps of the small widths desirable for optimum induction and good efficiency.

All such disadvantages are eliminated according to my invention by virtue of a novel winding system which is exemplified in FIG. 5 for a rotor having a collector with seven sequential collector segments. The winding is provided with taps denoted by 6 through 12. These taps are connected with respective small collector segments without requiring a star-point as in the case with a circuit connection of the windings illustrated in FIG. 4.

The zigzag path of the wire in the winding according to FIG. 5 resembles the winding design of cross-wound coils although, aside from appearance, the winding according to the invention differs in design and connection. For explaining the functioning of the winding according to the invention, the current path may be traced from the collector-segment tap 6, where an arrow represents the entering current flow, up to the collector tap 9 which then conducts the current out of the winding, as indicated by another arrow, and it will be recognized that the inclined wire portions form component current paths within which the current flows either from the top of FIG. 5 downwardly or from the bottom side upwardly. In order to make this clearly apparent, all wire portions that carry downwardly flowing currents are illustrated in FIG. 5 by full lines, whereas the wire portions traversed by currents in the upward direction are shown by broken lines. In the planar development of FIG. 5, the magnetic field has a direction perpendicular to the plane of illustration, as will be more fully recognized from FIG. 6 described below. Also with reference to FIG. 5, the poles N and S of the magnetic field, while not being as sharply distinct from each other as may appear from the schematic illustration, occupy the locations 13 and 14.

Shown in FIG. 6 is a cross section through the same winding inserted into a miniature motor according to the invention. According to FIG. 6, the motor shaft 21 is journalled in bearings 22 and 23 which are represented only schematically. A permanent magnet 15 produces the magnetic field in a cylindrical air gap 16 identified by a bracket, the field having in the illustrated sectional view the direction indicated by an arrow 17. The outer iron yoke of the motor is denoted by 18, and the winding designed according to the invention and shown in FIG. 5 is denoted by 19.

In the embodiment of FIGS. 5 and 6, the winding is preferably given two layers of wire turns. That is, the radial thickness of the winding is equal to twice the diameter of the wire. The following numerical values are given by way of example: diameter of permanent magnet 15: 16 mm.; wire thickness of the winding 19: 0.15 mm.; width of the air gap 16: 0.8 mm.; induction: 6000 to 7000 gauss. It will be recognized from this numerical example how narrow the winding can be made. It has been found that a large number of conductors with a weak magnetic field in a conventional rotating-coil motor do not result in an efficiency as high as obtainable with a small number of conductors in a very strong magnetic field. Consequently, the small width of the air gap in a motor according to the invention is a particularly salient feature.

The connection of the taps 6 to 12 according to FIG. 5 is effected by means of the tap wires 119 which are joined, for example by soldering, with the commutator segments 20. Preferably, the commutator is given a very small diameter in order to minimize the brush friction losses, the particular commutator shown in FIG. 6 being in accordance with the one illustrated and described in my United States Patent No. 2,999,956, issued September 12, 1961, and assigned to the assignee of the present invention. That patent describes a commutator having a cylindrical sectional collecting surface formed by placing the insulated discs, carrying embedded round wires 20 (FIG. 6), in lathe and removing metal from the lateral outer surface of the end portions of the wires. The collecting surface has a diameter of about 1 mm. The winding possesses seven tap points, denoted by 6 to 12, which are connected with the respective seven collector segments 20 of FIG. 6. In FIG. 5, the winding, which in reality is completely cylindrical, is cut open around a generatrix line and is spread planar into the plane of illustration. The actual length of each turn of the winding extends from the left section line A—A to the right section line B—B.

It will be understood that the N pole at the right in FIG. 5 can be considered as the same N pole at the left. The stationary poles are shown as successively reached by each wire on the rotating armature.

It will be understood that the winding described above with reference to FIG. 5 may also be formed as a single layer of wire turns or may have more than two layers if the winding is to be dimensioned for correspondingly higher voltages. The winding turns have such a helical pitch that each winding portion, extending in skewed relation to the rotor axis from one axial side of the winding to the other has an axial length equal to the arcuate center spacing between each two adjacent field poles. The wire turns are preferably so placed beside each other that a complete winding turn about the entire periphery is continued in the next following turn which extends immediately adjacent to the first turn so that the totality of turns forms a substantially closed cylindrical winding body without appreciable spaces between the adjacent wire portions.

Effective with respect to the production of the desired torque is only the component of the current flow extending parallel to the axis. However, in a winding according to the invention, the component directed perpendicular to the axis does not cause any detrimental forces in other directions.

A particular advantage of the above-described winding is the fact that it can be fully produced by means of a winding machine similar to those used for the production of cross-wound coils of yarn.

It will noted from FIG. 6 that the winding 19 in the illustrated embodiment forms part of a bell-shaped armature of the motor which has a fixed core system composed of an inner stationary permanent magnet 15 and a stationary outer, cylindrical iron yoke or housing 18 forming together an annular gap in which the cylindrical winding structure 19 is rotatable. The magnet 15 is coaxially located within the yoke 18 so as to pass magnetic flux transversely of the annular surface of the yoke. The rotor comprises the rotatably mounted cylindrical armature coaxially interposed between the magnet 15 and the yoke 18. The armature comprises a layer of cylindrically and helically wound conductors 19. The winding structure 19 is formed of a single wire which continuously extends along skewed lines, the width of each individual turn extending from one axial side to the other of the winding structure over such a peripheral or arcuate distance that the wire from one winding side to the other passes from one pole of the magnet to the next pole. Each conductor makes a complete turn around and is restricted to the periphery of the armature. Each conductor has a helical pitch such that each winding portion of the conductor, extending in skewed relation to the rotor shaft from one axial side of the armature to the other, has an axial length equal to the spacing between the center lines of each two sequentially reached North-South field poles. The conductors are placed beside each other. As also explained, the wire winding, zig-zagging on a cylindrical surface forms a continuous closed cylindrical winding having its beginning and end as well as several other tap points connected to the respective segments of the commutator. A commutator has mutually insulated sequential segments individually electrically connected to the taps.

According to another feature of my invention, a particularly high degree of efficiency is obtained if the number of the winding taps and of the corresponding commutator segments has an odd value, preferably the value five, seven or nine. A greater number of taps and segments than nine is of no further advantage in miniature motors, as will be understood from the following.

For explanatory purposes, FIG. 7 again represents schematically the winding design explained above with reference to FIG. 5. The distance 31 in FIG. 7 is equal to the periphery, 360°, of the winding shown in developed planar form. Current is supplied to the winding at the point 32. The current leaves the winding at point 33 which is 180° displaced from point 32. As in FIG. 5, the individual turns of the winding are inclined, and those wire portions in which the current flows downwardly are shown by full lines, whereas those wire portions in which the current flows upwardly are shown by broken lines. The winding step or pitch, i.e. the recurrence of each zigzag turn, is $n \pm 1$, wherein $n$ denotes the total number of winding turns over the periphery of the winding structure. Shown in the schematic illustration of FIG. 7 is a winding step which is slightly smaller than 360° and amounts to $n-1$. From point 32, the currents flow away toward both sides with the result that active zones are formed in which, as explained above with reference to FIG. 5, the active component of the current, flowing on a slanting path, is directed upwardly or downwardly. This is indicated in FIG. 7 by arrows.

FIG. 8 shows an equivalent geometrical figure representative of the shape and distribution of the active current zones. It will be recognized that FIG. 8 is a simplified representation of FIG. 7. In the following considerations, reference is made to the simplified FIG. 8 in order to obviate the necessity of again developing each time the active current zones from the current paths in the wire turns of the winding.

Particularly apparent from FIG. 8 is the centrally located active current zone 34 in which the current flows upwardly as indicated by an arrow. Also apparent from FIG. 8 are the next adjacent active current zones 35 in which the current flows downwardly. Between these zones are triangular zones 36 in which the currents, as will be understood from FIG. 7, flow upwardly as well as downwardly with the same current intensities so that the zones 36 do not produce any force effects in the sinusoidal magnetic field of the field structure in which the winding is rotatable.

The differential intensity of the rhomboidal active current zone 34 is shown in FIG. 8 as a narrow and hatched vertical strip 37. This differential current intensity corresponds to the vertical height of the active current zone at the particular location under observation. If these heights 37 are continuously plotted over the base line 38 as shown in the graph of FIG. 9, a straight-line zigzag curve 39 is obtained which indicates the intensity of the active current zone at the individual points of the winding periphery.

Shown in FIG. 10 is a curve 40 which represents the course of the magnetic field in the core system shown in FIG. 6. The course of the magnetic induction along the periphery of the magnet system is sinusoidal.

The torque of a miniature motor as described above can be calculated by multiplying the ordinates of curves 39 and 40. The result is represented by the curve 41 in FIG. 11. It will be realized that FIG. 11 indicates how the active torque is distributed over the periphery; that is, curve 41 does not represent the time variations of the torque during one revolution.

For further explanation, FIG. 12 shows a winding which, in contrast to FIG. 8, is fed with current not at the tap points 32 and 33, but at the points 32 and 42 which are 120° peripherally spaced from each other. The active current zones are determined geometrically as described above with reference to FIG. 8. In analogy to the conditions explained above with reference to FIGS. 8 and 9, the curve 43 in FIG. 13 indicates the course of the active current zone along the periphery in a winding energized in accordance with FIG. 12. It will be recognized that when the feeder current is not supplied across a diameter as in FIGS. 7 and 8, the intensity curve of the active current zone versus the periphery assumes a trapezoidal shape. Furthermore, the triangular neutral zones 36, according to FIG. 12, become greatly enlarged. This is indicative of the fact that the winding is not as fully utilized as the one represented by FIG. 8. It follows that it is preferable to always provide for "diametrical energization" of the winding.

In a miniature motor as described above, the rotary motion of the commutator between the appertaining contact brushes has the effect that one or two commutator segments become temporarily short-circuited. Thus, FIG. 14 shows a commutator with five segments in which the upper brush 51 just short-circuits a pair of segments 52, 53. FIG. 15 shows a commutator with six segments at a moment in which two pairs of segments 54, 55 and 56, 57 are just short-circuited by the upper and lower brushes 58, 59 respectively. The effect of the short-circuited segment pairs upon the performance of the winding is such that five kinds of active current zones are developed. This is schematically illustrated in FIG. 16. The five different zones are the active current zones 34, similar to those of FIG. 8, in which the current flows upwardly, the active current zones 35 in which the current flows downwardly, the neutral zones 36, and additional zones 44 in which the current flows upwardly, but at only one-half of the normal intensity, and the zones 45 in which the current flows downwardly likewise at one-half of normal intensity. The low-intensity currents in zones 44 and 45 are represented in FIG. 16 by shortened arrows. If one plots the actual course of the current in an active zone over the abscissa, in the manner explained above with reference to FIGS. 8 and 9, a curve as shown at 46 in FIG. 17 is developed. This curve 46 is symmetrical to one-half of the periphery. This should be compared with FIG. 13 where the trapezoidal curve 43 appears in asymmetrical relation to the middle of the periphery.

FIG. 18 shows a five-part commutator in a rotary position in which no pair of segments is short-circuited, it being assumed, however, that the supply of current is not effected at two points 180° displaced from each other, but at points spaced 144°. With such an energization, the resulting active current is similar to curve 46 in FIG. 17. When the commutator rotates a further extent, for example to the position shown in FIG. 14, the active current is modified by the temporary short-circuit and resembles the curve 46 in FIG. 17. The time curve of the torque during a single rotation alternates between two conditions which correspond to the current intensity curves 43 and 46 in FIGS. 13 and 17, respectively.

It will be understood from the foregoing that the choice of five, seven or nine collector segments is particularly favorable. With a five-part commutator, the torque varies, as already explained, back and forth in accordance with the difference between the curves 43 and 46 in FIGS. 13 and 17. This occurs ten times during one rotation. Of course, for drawing a proper conclusion from the current-intensity curves of FIGS. 13 and 17 as to the torque curve, it must be kept in mind that the induction has a sinusoidal characteristic according to FIG. 10.

In contrast, if an even number of collector segments is used, the current intensity curve in one limit case would follow a course corresponding to curve 39 in FIG. 9. In the other limit condition, the curve would correspond to the one shown in FIG. 20, which was derived from FIG. 19 in the manner already explained. It will be recognized that the variations between FIGS. 9 and 20 are much greater than with an odd number of segments. That is, the non-uniformity in torque occurring during one revolution is correspondingly greater. This is aggravated by the fact that the torque now varies only six times during one rotation.

In summary, with an odd number of commutator segments, the disturbing torque variations, superimposed upon the useful uniform torque delivered by the motor, have a higher frequency and a lower amplitude than with an even number of segments. It is, therefore, particularly advantageous to provide such a motor with an odd number of segments. It will readily be realized, however, that this encounters an economical limit which is reached with nine segments. The provision of more than nine commutator segments involves a more difficult manufacture which is no longer compensated by an appreciable increase in torque or other improved operating conditions. This is because with a nine-part commutator, the energization of the winding already takes place at two points spaced 160° from each other. The foregoing considerations of course apply to miniature motors for low voltages between 0 to 6 volts. For higher voltages and larger motors, the provision of a greater number of collector segments may be preferable.

As mentioned, an odd number of commutator segments results in current distribution curves which vary between those shown in FIGS. 13 and 17. In order to always obtain best utilization with respect to torque, the magnetic-field curve is preferably so placed relative to the fixed commutator brushes, that the sum of the products formed of the induction times the ordinates of the curves according to FIGS. 13 and 17, assumes the maximum value. This is elucidated by FIG. 21. Shown in FIG. 21 are the two current curves 43 and 46 (FIGS. 13 and 17). Indicated by a broken line is the sinusoidal curve of the magnetic field 40 corresponding to FIG. 10. However, the peak of curve 40 in FIG. 21 is not placed symmetrical with respect to the center line, but is displaced by the amount 47. Such displacement is effected by correspondingly positioning the poles of the permanent magnet 15 with respect to the position of the fixed commutator brushes.

While the invention is described above with reference to a miniature motor, it should be understood that it is not limited to this particular purpose, but that a winding according to the invention is applicable to advantage in all cases where high mechanical torques are to be produced by means of electric currents and where this is to be done with relatively simple and cheap means. For example, such a winding is also advantageously applicable in measuring devices, angle-transmitting devices and similar electric equipment.

I claim:

1. A miniature motor comprising a stationary annular outer iron yoke, a stationary magnet coaxially located within said yoke and forming an annular field gap together therewith, a rotor comprising a hollow cylindrical armature coaxially located in said gap, said armature having a winding of sequential cylindrically and helically wound wire turns around, and restricted to, the periphery of the armature, each winding turn extending in skewed relation to the rotor axis from one axial side of the armature to the other along a portion of the periphery substantially equal to the peripheral spacing between each two sequential north-south field poles of said magnet, said winding having peripherally distributed taps, and a commutator having mutually insulated sequential segments individually electrically connected to said taps.

2. An electric motor comprising a stator structure having an annular iron yoke and a permanent magnet located coaxially within said yoke and fixed relative thereto, said yoke and magnet forming an annular field gap, said magnet having north and south poles diametrically oriented relative to said yoke, a rotor shaft coaxially revolvable relative to said stator structure, a generally bell-shaped rotor fastened to said shaft and having a hollow cylindrical winding portion coaxially located in said gap, said portion comprising a wire extending continuously over the cylinder surface of said portions on skewed lines of which each passes from one axial side of said portion to the other along a peripheral distance equal to the peripheral pole spacing of said magnet, said winding portion having taps uniformly distributed peripherally, and a commutator having segments connected with said respective taps.

3. An electric motor comprising a stationary annular outer iron yoke, a stationary magnet coaxially located within said yoke so as to pass magnetic flux transversely of the annular surface of the yoke, a rotor comprising a rotatably mounted cylindrical armature coaxially interposed between the magnet and the yoke, said armature comprising a layer of cylindrically and helically wound conductors, each conductor making a complete turn around and restricted to the periphery of the armature and having a helical pitch such that each winding portion of the conductor, extending in skewed relation to the rotor shaft from one axial side of the armature to the other, has an axial length equal to the spacing between the center lines of each two sequentially reached north-south field poles, the conductors being placed beside each other, a complete winding turn about the entire periphery being continued in the next following turn to form a continuous closed cylindrical winding, said winding having peripherally distributed taps, and a commutator having mutually insulated sequential segments individually electrically connected to said taps, said helical winding obviating end turning portions and obviating need for a star point connection to the commutator segments.

4. A miniature electrodynamic device, comprising a rotor shaft, a stationary annular outer iron yoke through which the shaft passes, a stationary magnet system located within said yoke so as to pass magnetic flux transversely of the shaft and of the annular surface of the yoke, a rotor comprising a rotating cylindrical hollow armature mounted upon and coaxial with the shaft and interposed between the magnet system and yoke, said armature comprising at least one layer of continuously cylindrically and helically wound endless coil restricted to the cylindrical surface of the armature periphery and having a helical pitch such that each coil winding portion, extending in skewed relation to the rotor axis from one axial side of the coil to the other, has an axial length such that it is within the range of a pole division over the entire length of each turn of the winding, said continuous helical winding of the coil obviating end turning portions, said winding having peripherally distributed taps on one axial side of the armature, a coaxially mounted rotatable body, commutator sections carried by said body in insulated relation with respect to each other, and individual electric connections between said taps and said commutator sections.

5. A miniature electrodynamic device, comprising a rotor shaft, a stationary cylindrical outer iron yoke through which the shaft passes, a stationary permanent magnet system located within said yoke so as to pass magnetic flux transversely of the shaft and of the cylindrical surface of the yoke, a rotor comprising a rotating cylindrical substantially ironless hollow armature mounted upon and coaxial with the shaft and interposed between the permanent magnet system and yoke, said armature comprising at least one layer of cylindrically and helically wound endless coil restricted to the armature periphery and having a helical pitch such that each coil winding portion extending in skewed relation to the rotor shaft from one axial side of the coil to the other has an axial length such that it is within the range of a pole division over the entire length of the winding, said continuous helical winding of the coil obviating end turning portions wasteful of coil material, taps on an end peripheral portion of the armature, a coaxially mounted rotatable insulating disc located adjacent said end portion of the armature, commutator sections carried by said body in insulated relation with respect to each other, and individual electric connections between said taps and said commutator sections.

6. In an electric motor according to claim 4, said commutator sections and taps having an odd number.

7. An electric motor comprising a stator structure having an annular iron yoke and a permanent magnet located coaxially within said yoke and fixed relative thereto, said yoke and magnet forming an annular field gap, said magnet having north and south poles diametrically oriented relative to said yoke, a rotor shaft coaxially revolvable relative to said stator structure, a generally bell-shaped rotor fastened to said shaft and having a hollow cylindrical winding portion coaxially located in said gap, said portion comprising a wire extending continuously over the cylinder surface of said portions on skewed lines of which each passes from one axial side of said portion to the other along a peripheral distance equal to the peripheral pole spacing of said magnet, said winding portion having an odd number, between five and nine, of taps uniformly distributed over the periphery of said winding at one axial side thereof, and a commutator having the same number of segments connected to said respective taps.

References Cited by the Examiner
UNITED STATES PATENTS 820,997  5/06  Steinmetz _____ 310—207

FOREIGN PATENTS 545,345  7/22  France.
182,775  8/55  Austria.

OTHER REFERENCES

Croft, Terrell, Alternating-Current, McGraw-Hill, New York, 1924.

Arnold, E., Die Gleichstrom Machine, erster Band, pages 67–69, Julius Springer, Berlin, 1906.

MILTON O. HIRSHFIELD, *Primary Examiner.*